United States Patent
Speks

(10) Patent No.: US 9,872,165 B2
(45) Date of Patent: Jan. 16, 2018

(54) METHOD AND APPARATUS FOR ESTABLISHING INTRA-NETWORK CALLS

(71) Applicant: Telefonaktiebolaget LM Ericsson (publ), Stockholm (SE)

(72) Inventor: Oliver Speks, Eschweiler (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

(21) Appl. No.: 15/036,663

(22) PCT Filed: Nov. 13, 2013

(86) PCT No.: PCT/EP2013/073716
§ 371 (c)(1),
(2) Date: May 13, 2016

(87) PCT Pub. No.: WO2015/070899
PCT Pub. Date: May 21, 2015

(65) Prior Publication Data
US 2016/0295393 A1 Oct. 6, 2016

(51) Int. Cl.
*H04W 4/00* (2009.01)
*H04W 8/04* (2009.01)
(Continued)

(52) U.S. Cl.
CPC ............ *H04W 8/04* (2013.01); *H04W 8/08* (2013.01); *H04W 8/18* (2013.01); *H04W 76/02* (2013.01)

(58) Field of Classification Search
CPC ........... H04M 2207/18; H04M 7/006; H04M 7/1245; H04M 2207/20; H04M 7/0093;
(Continued)

(56) References Cited

U.S. PATENT DOCUMENTS

2002/0159420 A1  10/2002  Naqvi et al.
2003/0129991 A1*  7/2003  Allison ............... H04Q 3/0025
                                                      455/456.1
(Continued)

FOREIGN PATENT DOCUMENTS

WO    WO 2010/111561 A1    9/2010

OTHER PUBLICATIONS

International Search Report and Written Opinion of the International Searching Authority, Application No. PCT/EP2013/073716, dated Aug. 26, 2014.

(Continued)

*Primary Examiner* — Fred Casca
(74) *Attorney, Agent, or Firm* — Sage Patent Group

(57) ABSTRACT

A method for establishing an intra-network call between a first subscriber, which is served by a first call control node in a visited public land mobile network, V-PLMN, and a second subscriber of a home public land mobile network, H-PLMN, which is different to the V-PLMN. The second subscriber is served by a second call control node of the same V-PLMN. The method include sending, by the first call control node, a call setup message to a gateway node in the V-PLMN which is adapted to perform re-routing of calls to another network. The gateway node requests routing information of the second call control node from a proxy location register, PLR, in the V-PLMN. The gateway node routes the call to the second call control node responsive to if routing information towards the second call control node is available from the PLR.

13 Claims, 7 Drawing Sheets

(51) Int. Cl.
*H04W 8/08* (2009.01)
*H04W 8/18* (2009.01)
*H04W 76/02* (2009.01)

(58) Field of Classification Search
CPC .. H04M 7/0033; H04M 7/1235; H04M 15/90; H04M 3/2281; H04M 15/00; H04M 15/62; H04M 15/80; H04M 15/8038; H04M 2215/62; H04M 3/54; H04M 2242/30; H04M 3/42348; H04M 2242/14; H04M 3/42059; H04M 3/42229; H04M 2203/2072; H04M 3/53308; H04M 15/8033; H04M 15/8044; H04M 15/8055; H04M 2242/04; H04M 2207/12; H04M 3/42; H04M 3/42042; H04M 3/422; H04W 4/021; H04W 4/001; H04W 4/12; H04W 8/18; H04W 4/06; H04W 4/02; H04W 4/16; H04W 64/00; H04W 40/20; H04W 4/22; H04L 67/306
USPC ... 455/432.1, 433, 445, 432.2, 432.3, 435.1, 455/422.1, 428, 456.1, 461, 466, 456.4, 455/552.1, 456.3, 404.1, 404.2; 370/329, 370/341, 331, 317
See application file for complete search history.

(56) References Cited

U.S. PATENT DOCUMENTS

2007/0232280 A1* 10/2007 Pruser ................... H04W 76/06
455/414.1
2009/0005037 A1* 1/2009 Noldus ................ H04Q 3/0041
455/433

OTHER PUBLICATIONS

3GPP, Technical Specification—"3rd Generation Partnership Project; Technical Specification Group Core Network and Terminals; Gateway Location Register (GLR); Stage 2 (Release 11)", 3GPP TS 23.119 V11.0.0 (Sep. 2012), 131 pp.
CDMA Development Group, "Direct Routing for Roamer to Roamer", CDG Document 96, Version 1.0, Jan. 1, 2005, 26 pp.

* cited by examiner

US 9,872,165 B2

METHOD AND APPARATUS FOR ESTABLISHING INTRA-NETWORK CALLS

CROSS REFERENCE TO RELATED APPLICATION

This application is a 35 U.S.C. §371 national stage application of PCT International Application No. PCT/EP2013/073716, filed on Nov. 13, 2013, the disclosure and content of which is incorporated by reference herein in its entirety. The above-referenced PCT International Application was published in the English language as International Publication No. WO 2015/070899 A1 on May 21, 2015.

TECHNICAL FIELD

The invention relates to a method and apparatus for establishing an intra-network call between a first subscriber, which is served by a first call control node in a visited public land mobile network, V-PLMN, and a second subscriber of a home public land mobile network, H-PLMN, which is different to the V-PLMN, and wherein the second subscriber is served by a second call control node of the same V-PLMN.

BACKGROUND

Mobile telecommunication users travel between multiple Public Land Mobile Networks (PLMNs) utilizing the same telephone number and the same mobile station to originate outgoing calls and to receive incoming calls. The ability for a cellular subscriber to automatically make and receive voice calls, to send and receive data or access other services when traveling outside the geographical coverage area of the home PLMN (H-PLMN) by means of using a Visited PLMN (V-PLMN) can be defined as "roaming". The differentiation between a H-PLMN and a V-PLMN is based on the availability of the subscriber data in the home subscriber register of the network, which may be a Home Location Register (HLR) in a GSM technology-based PLMN. The differentiation between H-PLMN and V-PLMN is therefore always related to a specific subscriber. If this subscriber roams into a V-PLMN then the home subscriber register of this V-PLMN does not comprise subscriber data or a subscriber record related to this specific subscriber. To establish a call to a subscriber served by a call control node in a V-PLMN it is necessary to route the call to the call control node of the V-PLMN.

If a calling subscriber and a called subscriber are both served by the same network which is a V-PLMN for the called subscriber, two inter-network call legs between this V-PLMN and the H-PLMN of the called subscriber are needed to route the call to the call control node serving the called subscriber.

The conventional way of routing a call between two subscribers that are located within the same network and wherein at least the called subscriber has a subscription to a home network which is different to the current serving network requires to route the call through the home network of the called subscriber. A gateway node in the V-PLMN may route the call towards a gateway node in the H-PLMN of the called subscriber. The gateway node in the H-PLMN may be a Gateway Mobile Switching Center (GMSC). This gateway node interrogates the home subscriber register, which may be a HLR that keeps the subscriber record of the called subscriber to get information about the current serving call control node of the called subscriber. After getting this information the call is routed back into the V-PLMN of the subscriber. This effect—which is commonly referred to as "tromboning"—is wasteful on network resources, degrades user experience due to this long-lasting call setup and is expensive for network operators and end users.

Standard 3GPP TS 23.119 Version 4.0.0 from September 2001 introduced a Gateway Location Register (GLR) which is located in the visited network. The GLR is a node between the call control node in the visited network and the home subscriber register in the home network. FIG. 1 depicts a set-up according to the prior art which implements a GLR 121 according to the standard mentioned above. Two subscribers 101 and 102 are served via radio access nodes 128 and 127 by call control nodes 124, 123 in a network "A" 120. The call control nodes 123, 124 are depicted as MSC-Servers (MSC-S). It may also be possible that the call control nodes are Serving "General Packet Radio Service" (GPRS) Support nodes (SGSNs) in an UMTS-based network. Network A 120 is a V-PLMN for subscriber B 101 which is the called subscriber in this set-up. FIG. 1 further depicts two Media Gateways (M-MGW) 125, 126 which are adapted to route the payload data between the subscribers 102, 101. Payload data may be voice or other data. The M-MGWs 125, 126 are controlled by the call control nodes 123, 124. It may be possible that there are more than two call control nodes 123, 124 and/or more than two media gateways 125, 126 through which control data and payload data is routed. Both subscribers 101, 102 are represented by User Equipment (UEs) which comprise subscriptions to network operators in their H-PLMNs. This can be performed by introducing a SIM-card into the UEs 101, 102 which comprises subscription information. The network A 120 further comprises an international gateway (IGW) 122 which is adapted to connect the network A 120 to another network B 110. It is therefore possible to send connection data between both networks A 120 and B 110 to route calls between networks. The IGW 122 is connected to a gateway node GMSC 112 in the network B 110 which is the H-PLMN of subscriber B 101. The GMSC 112 can also act as an IGW for network B 110. The GMSC 112 is connected to a home location register HLR 111 which comprises a subscriber record of subscriber B. The HLR 111 in network B 110 and the GLR 121 in network A 120 are connected such that the GLR 121 is able to fetch subscriber data from the HLR 111 when the subscriber B 101 performs the first location update procedure in the visited network.

FIG. 2 shows a call establishment between a UE A 102 which is the UE of subscriber A and a UE B 101 which is the UE of subscriber B. UE A 102 sets up a call towards UE B 102 by informing the serving call control node MSC/VLR A 123. The MSC/VLR A 123 is aware of the fact that the called subscriber UE B 101 does not have a subscription to the network A 120 based on the called party number and will forward the call set-up message 201 to the international gateway IGW 122. The IGW 122 routes the call set-up message, comprising the MSISDN (Mobile Subscriber ISDN), to the GMSC 112 of network B 110. GMSC 112 fetches the subscriber data via an "Inv: Send Routing Information" message 202 from the HLR 111. This message comprises the MSISDN of UE A 102. The HLR 111 requests a Roaming Number from the VLR (Visited Location Register) of the MSC/VLR B 124 via the GLR 121 by a message "Inv: Provide Roaming Number" 203, comprising the address of the VLR (Visited Location Register) serving the called subscriber UE B 101 and the IMSI (International Mobile Subscriber Identity) of the UE A 102. The GLR 121 forwards this request to the MSC/VLR B 124 with a message "Inv: Provide Roaming Number" 204. As an answer to this request the Roaming Number and the IMSI is sent from the MSC/VLR B 124 to the GLR 121 in a message "Res: Provide Roaming Number" 205. The GLR 121 forwards this response in a further message towards the HLR 111. The HLR 111 sends the routing information which comprises the roaming number to the GMSC 112 which routes the call via the IGW 122 to the MSC/VLR B 124 which establishes a connection via the radio access with UE B 101. A dashed line shows the border between the H-PLMN and the V-PLMN.

The Roaming Number must always be fetched from the HLR 111 via the GMSC 112 to establish a call between two subscribers in a V-PLMN 120 of the called subscriber. The GLR 121 is only used to optimize the location updating and the handling of subscriber profile data across network boundaries. When a subscriber is roaming within a V-PLMN 120 the GLR 121 acts during the location update procedure like a home subscriber register towards the call control node in the V-PLMN. This solution reduces the location update related signaling between the V-PLMN and the H-PLMN when the subscriber registers at a new location within the V-PLMN using the "Location Update" procedure. The GLR 121 does not reduce the signaling between visited network 120 and home network 110 of a called subscriber 101 when the calling subscriber 102 is located in the same network as the called subscriber 101.

SUMMARY

It is an object of the present invention to improve a call establishment between two subscribers. This object is achieved by the independent claims. Advantageous embodiments are described in the dependent claims.

According to a first aspect of the invention, a method for establishing an intra-network call between a first subscriber, which is served by a first call control node in a visited public land mobile network (V-PLMN) and a second subscriber of a home public land mobile network (H-PLMN), which is different to the V-PLMN and which is served by a second call control node of the same V-PLMN is provided. The method comprises the step of sending, by the first call control node, a call setup message to a gateway node in the V-PLMN which is adapted to perform re-routing of calls to another network. The method further comprises the step of requesting, by the gateway node, routing information of the second call control node from a proxy location register (PLR) in the V-PLMN. The method further comprises the step of routing, by the gateway node, the call to the second call control node if routing information towards the second call control node is available from the PLR.

According to a further aspect of the invention a method of updating a subscriber record of a subscriber in a proxy location register (PLR) of a visited public land mobile network (V-PLMN) is provided. The subscriber has a subscription to a home public land mobile network (H-PLMN), which is different to the V-PLMN. The method comprises the step of receiving, from a call control node serving the subscriber in the V-PLMN, an update location message as part of a location update procedure initiated by the subscriber. If the subscriber record is not available in the PLR, a subscriber record is generated in the PLR. If the subscriber record is available in the PLR, the data in the subscriber record is updated by storing the address of the call control node serving the subscriber.

According to another aspect of the invention a method of deleting a subscriber record of a subscriber in a proxy location register (PLR) of a visited public land mobile network (V-PLMN) is provided when the registration of the subscriber at a call control node of the V-PLMN is terminated. The subscriber has a subscription to a home public land mobile network (H-PLMN), which is different to the V-PLMN. The PLR receives, from a subscriber register in the H-PLMN, a cancelation message for the subscriber record. Further the address of the call control node serving the subscriber in the subscriber record is marked as invalid. The method further comprises the steps of starting a deletion timer, related to the subscriber record and forwarding, by the PLR, the cancelation message to the call control node in the V-PLMN.

According to another aspect of the invention a proxy location register (PLR) of a visited public land mobile network (V-PLMN) is provided. The PLR comprises a storing unit for storing a subscriber record of a subscriber, served by a call control node in the V-PLMN. The subscriber has a subscription to a home public land mobile network (H-PLMN), which is different to the V-PLMN.

The subscriber record comprises identification information of the call control node. The PLR further comprises a first receiving unit for receiving, from a gateway node of the V-PLMN, a request for providing routing information leading towards the call control node serving the called subscriber and a first sending unit for sending the routing information to the gateway node.

According to another aspect of the invention a gateway node of a visited public land mobile network (V-PLMN) is provided. The gateway node comprises a first receiving unit for receiving, from a first call control node in the V-PLMN, a call setup message for setting up a call between a first subscriber, which is served by the first call control node, and a second subscriber of a home public land mobile network (H-PLMN), which is different to the V-PLMN. The second subscriber is served by a second call control node in the same V-PLMN and the call setup message comprises identification information of the second subscriber. The gateway node further comprises a first sending unit for sending a request for a roaming number to a proxy location register (PLR) in the V-PLMN and a second receiving unit for receiving a roaming number from the PLR. The gateway node further comprises a second sending unit for sending the call setup message to the second call control node.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

BRIEF DESCRIPTION OF THE FIGURES

In the following, the invention will further be described with reference to exemplary embodiments illustrated in the figures, in which.

DETAILED DESCRIPTION

Figure 1:
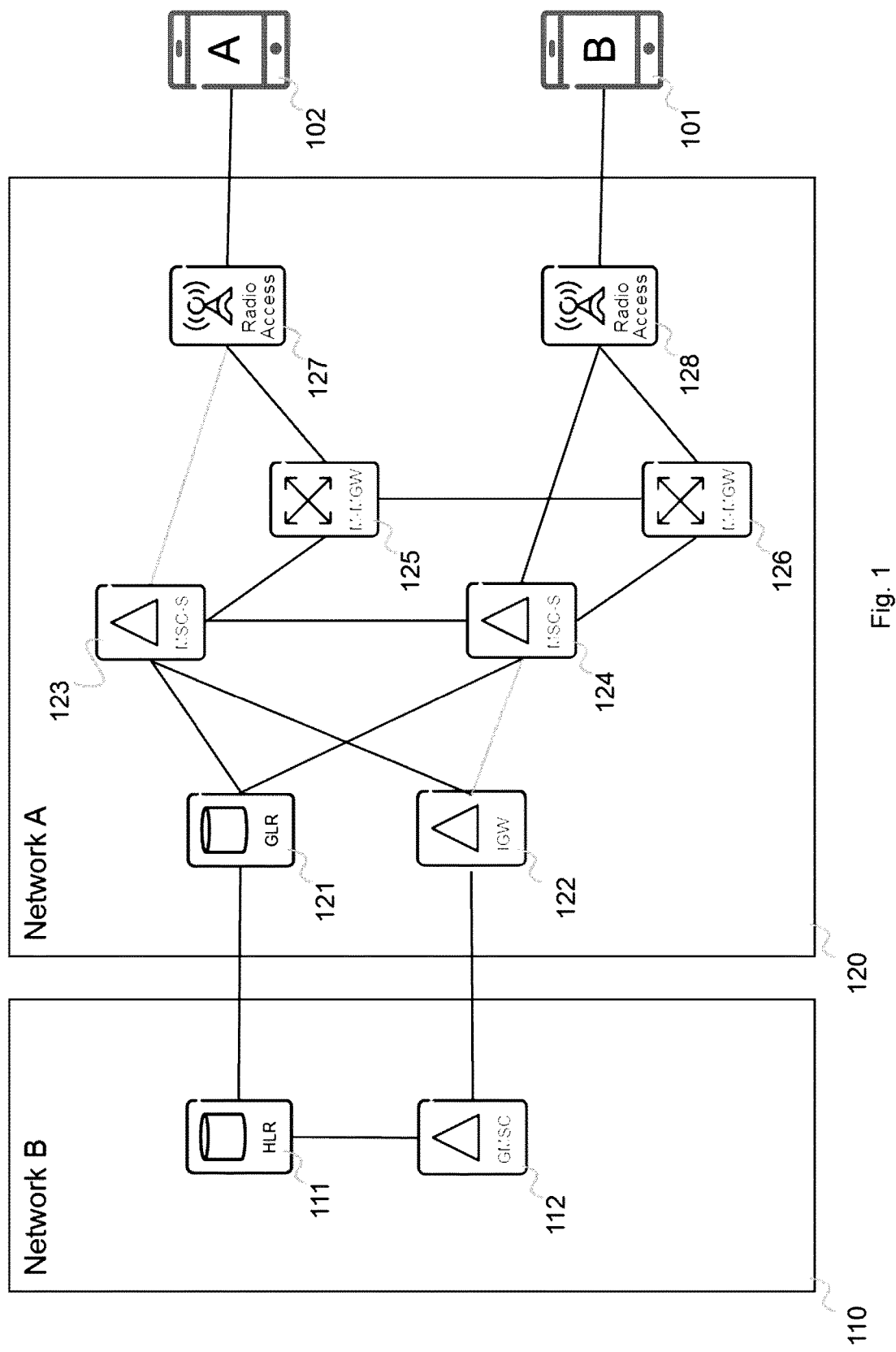
FIG. 1 shows a block diagram of a network layout for a call between two subscribers in the same network according to prior art.
Figure 2:
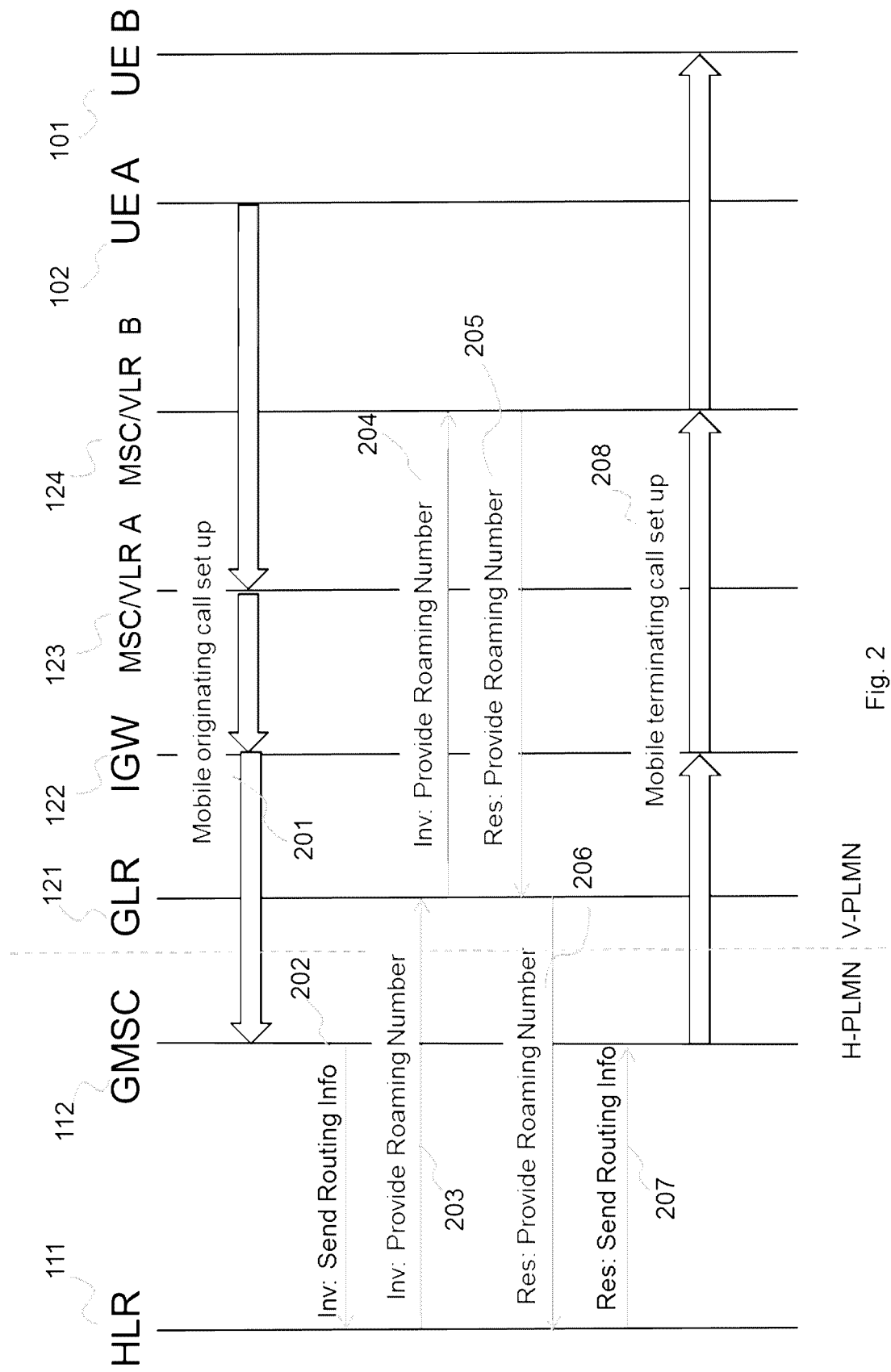
FIG. 2 shows a message flow diagram of a routing of a call between two subscribers in a network layout according to FIG. 1.

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with Global System for Mobile Communication (GSM) standard terminology to illustrate the present invention, they are equally applicable to other kinds of mobile communication systems like the Universal Mobile Telecommunication System (UMTS). Also, the invention may be practiced in any network to which mobile users may attach. For example, the present invention is applicable to, besides cellular networks, Local Area Networks (LANs), Wireless LANs (WLANs), or similar wireless networks, but also to wireline networks such as, for example, the intranet of a company or the Internet. Further, the term User Equipment (UE) used herein below may be any kind of mobile communication device like a mobile telephone, a Personal Digital Assistant (PDA), a network card, a laptop or any other mobile communication apparatus which is capable of communicating wirelessly (via an air interface) or wirelined with a network. Although a specific protocol stack is used below to describe the present invention, any other suitable protocol stack may equally be used.

Those skilled in the art will further appreciate that the functions explained herein below may be implemented using hardware circuitry, software means, or a combination thereof. All nodes may be designed as logical functions and may be implemented in other nodes. It may therefore be possible that functionality of a gateway node may be implemented in a call control node or vice versa. It may also be possible that a proxy location register may be implemented as functionality in a gateway node or in any other node as part of the visited network.

The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Within the context of the present application, a subscriber who has a subscription to a specific telecommunication network has closed a contract or an agreement with an operator of that specific telecommunication network to use the services of that telecommunication network via a User Equipment (UE). If a subscriber has a subscription to a telecommunication network, which may be the Home (H)-PLMN of that subscriber, the subscriber data is stored in a register in that telecommunication network or H-PLMN. Within the context of the present application a Visited (V)-PLMN of a subscriber is a telecommunication network which does not comprises the subscriber data in its home location register (HLR).

Within the context of the present application, the term "subscriber" is used in combination with a UE comprising the subscription (e.g. in form of a SIM card). The UE is therefore related to this specific subscription.

Within the context of the present invention the calling subscriber and the called subscriber may be served by one MSC/VLR. Even in this case the call setup is performed as if both subscribers are served by different MSC/VLRs. In the case that both subscribers are served by the same MSC/VLR the different MSC/VLRs, named as MSC/VLR A and MSC/VLR B, have to be interpreted as one single MSC/VLR with a dedicated logical entity for each subscriber A and B. In this case MSC/VLR A and MSC/VLR B or the first and second MSC-S should be interpreted as different instances in one MSC/VLR.

Figure 3:
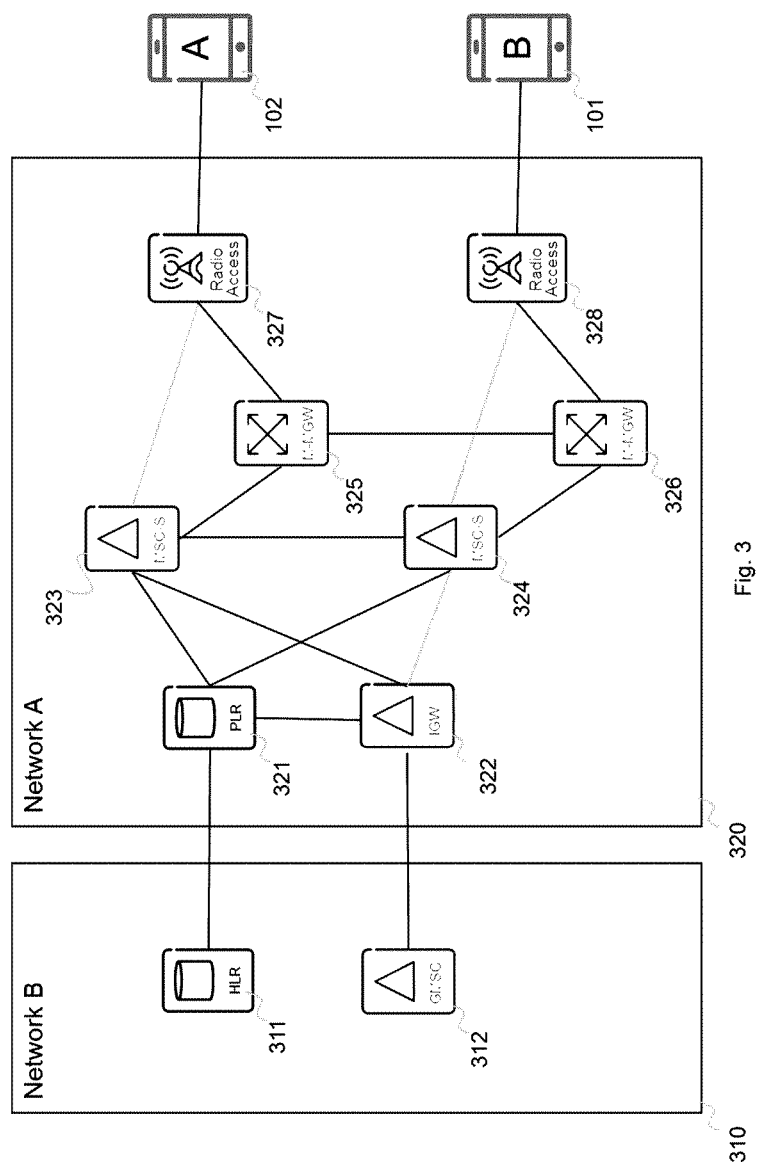
FIG. 3 shows a block diagram of a network layout for a call between two subscribers according to one embodiment of the invention.

Referring to FIG. 3, a block diagram of a network layout for a call between two subscribers according to one embodiment of the invention is shown. Two subscribers, represented by their UEs 101, 102 are registered in a network A 320 via Radio Access nodes 327, 328 at control nodes 323, 324. It may be possible that both subscribers 101, 102 are using the same Radio Access node 327 or 328 for communicating with the network A 320. The Radio Access nodes 327, 328 may represent Radio Access Networks (RANs) related to the Network A 320. It may also be possible that at least one subscriber 101, 102 is connected via any other technology to the Network A 320. It may be possible that other technologies are Wireless LAN or a wireline connection. One subscriber 101 is registered at a control node 324 and one subscriber 102 is registered at a control node 323. The control nodes 323, 324 may be Mobile Switching Center (MSC)—Servers or Serving GPRS Support Nodes (SGSN). The control nodes 323, 324 are adapted to control e.g. the call setup between both subscribers in the network. It is assumed that the control nodes 323, 324 are arranged with Visitor Location Registers (VLRs). A VLR comprises data of each subscriber which is served by the corresponding control node. In this example the VLR of MSC-S 323 comprises subscriber data of subscriber A 102 and the VLR of MSC-S 324 comprises subscriber data of subscriber B 101. In the following the control node is named as a MSC/VLR to make clear that the control node comprises a logical entity for controlling the call (MSC) and a database (VLR) for storing data of subscribers that are served by the MSC. Both logical entities are normally implemented in one physical entity but it may also be possible to split up the control node into two physical entities MSC and VLR which are connected. The call control node is represented as MSC-S in FIG. 1 and FIG. 3 and may also comprise a related VLR. The payload data, which may be voice data or video data or any other kind of data which should be exchanged between the UEs of the subscriber 101, 102, are routed via Media Gateways 325, 326 in the network A 320. The Media Gateways 325, 326 are controlled by the respective control nodes 323, 324. It may be possible that the payload data is routed over additional not depicted Media Gateways. Network A 320 further comprises an International Gateway (IGW) 322 which is adapted to perform re-routing of calls to other networks (e.g. network B 310 in this embodiment). Based on different parameters in a call setup message the call control node 323, 324 will forward the call control signalling to the IGW 322. The calling party, which may be in this example subscriber A 102, provides the number of the called party, which is subscriber B 101 in this embodiment, to the serving control node 323. After the number of the called party is analyzed by the control node 323 the control node 323 decides whether to forward the call to the IGW 322 or to route the call internally in the network A 320. If the number of the called party comprises an indication that the called subscriber 101 does not have a subscription to this network A 320 the call is forwarded to the IGW 322. It is assumed that the called subscriber 101 has a subscription to another network B 310 which is different to the network A 320 in which the UEs 101, 102 of both subscribers are currently served. The subscription of the subscriber A 102 may be a subscription to network A 320 or to any other network (e.g. network B 310). It is therefore assumed that subscriber A 102 is served by a first call control node 323 in the network A 320 and subscriber B 101 has a subscription to network B 310, which is different to network A 320, and wherein subscriber B 101 is served by a call control node 324 of network A 320. It is further assumed that network A 320 is a Visited PLMN (V-PLMN) of subscriber B 101 and network B 310 is the Home PLMN (H-PLMN) of subscriber B 101. Network A further comprises a Proxy Location Register 321 which is connected to the control nodes 323, 324 and which is further connected to the IGW 322. According to the invention the PLR 321 is involved in the call set-up between subscriber A 102 and subscriber B 101 and may comprise subscriber data of the called subscriber B 101. The PLR 321 is further connected to the HLR 311 of network B 310 which is the H-PLMN of subscriber B 101.

Figure 4:
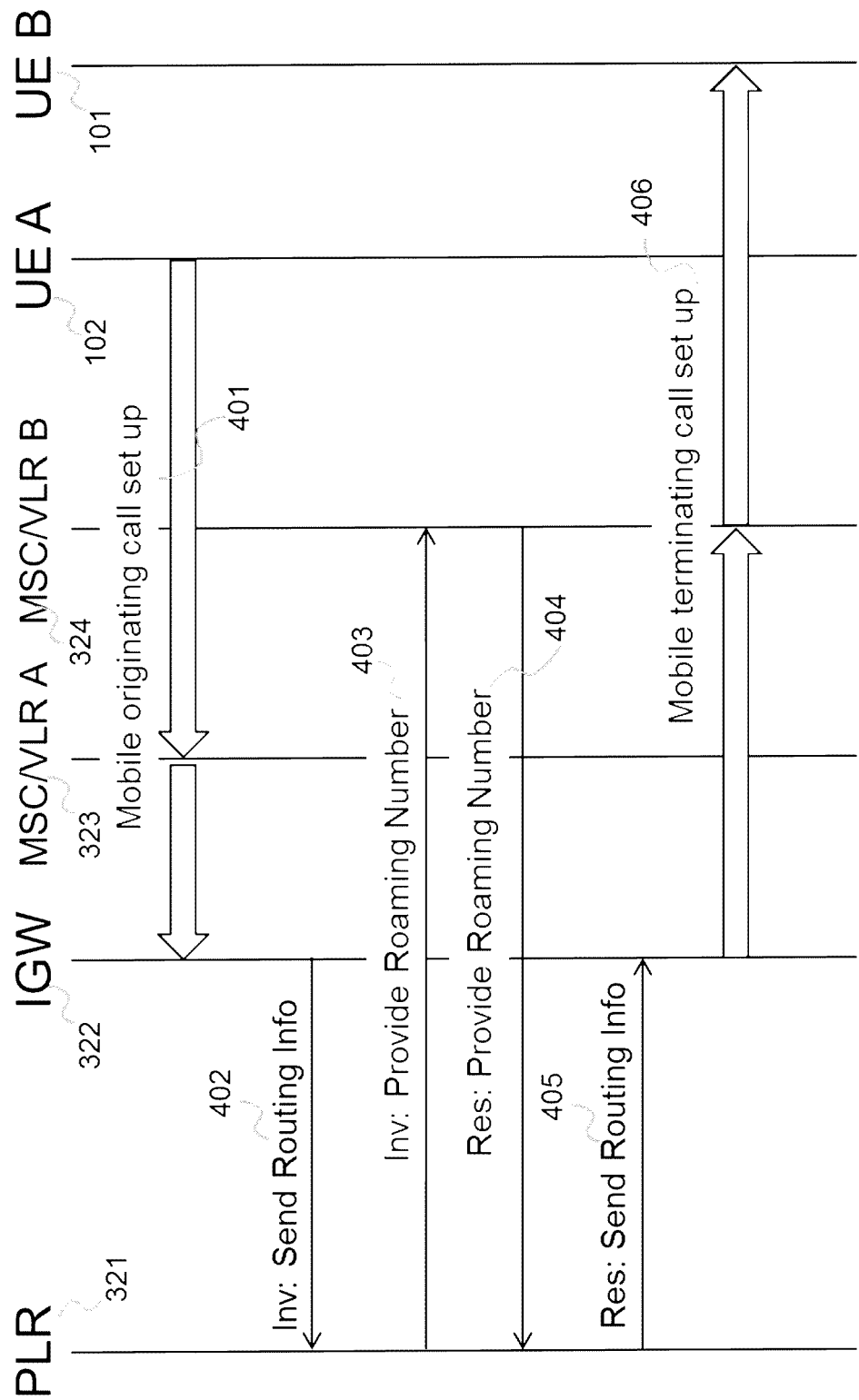
FIG. 4 shows a message flow diagram of a routing of a call between two subscribers according to one embodiment of the invention.

FIG. 4 shows a message flow diagram of a routing of a call between two subscribers 101, 102. UE A 102 wants to establish a call to UE B 101. The call setup 401 is first established between the caller UE A 101 and the serving control node MSC/VLR A 323 of the network A 320 based on the MSISDN of UE B 101. Due to the fact that the called party may not be served by the same control node MSC/VLR A 323 and that the number of the called party UE B 101 indicates a subscription of UE B 101 to another network (network B 310) the call is routed to the IGW 322. The IGW 322 is adapted to perform routing of calls to another network. According to the invention IGW 322 will request routing information leading towards the call control node MSC/VLR B 324 serving the called subscriber UE B 101 from the Proxy Location Register (PLR) 321 which is located in the same network A 320. This may be done by sending in a next step 402 a message "Inv: Send Routing Information" to the PLR 321. This message comprises the identification of subscriber B. This identification may be the MSISDN of subscriber B 101 or any other telephone number identifying the subscriber B 101. The MSISDN can be named as the Mobile Subscriber ISDN Number, the Mobile Station International ISDN Number or the Mobile International ISDN Number which is a telephone number that has been assigned to subscriber B 101. The routing information is information which leads towards the serving MSC/VLR B 324 of subscriber UE B 101. After the routing information is provided by the PLR 321 to the IGW 322 in a message 405 "Res: Send Routing Information, the IGW 322 routes the call towards the serving control node MSC/VLR B 324 of the called subscriber UE B 101 which establishes the call to the subscriber B 101 in a mobile terminating call set up procedure 406. Therefore the PLR 321 comprises subscriber data of UE B 101. At least the address of the serving control node MSC/VLR B 324, the IMSI and the MSISDN of the called subscriber B 101 must be available in the PLR 321 within a subscriber record and the subscriber record has to be identifiable based on the IMSI as well as the MSISDN.

Advantageously the so-called intra-network call establishment enables the call not to leave the network A 320 as the V-PLMN 320 of the called subscriber B 101 and is solely handled in the V-PLMN 320 without any involvement from the H-PLMN 310 of the called subscriber B 101. In particular, the call is routed inside the V-PLMN 320 to the second call control node 324.

This results in less inter-network traffic for calls in which both subscribers A, B 101, 102 are located in the same network 320 and wherein the called subscriber B 101 has a subscription to a different network A 310.

After the PLR 321 receives a request for routing information 402 it may request a Roaming Number from the serving call control node MSC/VLR B 324 of subscriber UE B 101 which is also located in network A 320. The address of the second call control node 324 may be retrieved by the PLR 321 during a location update procedure initiated by the second subscriber 101 when the second subscriber 101 registers at the second call control node 324. This procedure is explained later on. The request for the Roaming Number can be done by sending a message 403 "Inv: Provide Roaming Number" which is answered by a message 404 "Res: Provide Roaming Number" including a Roaming Number which is valid for this specific call set-up. In particular the PLR 321 requests a roaming number of the second subscriber 101 from the second call control node 324.

The IGW 322 may check whether subscriber data of subscriber B 101 can possibly be available as a subscriber record in the PLR 321. This may be done by analyzing the country code and further digits of the called party number, which may reveal if the called party number does not belong to a mobile network, before routing information is requested in step 402. This way, obsolete queries to the PLR 321 can be avoided for calls towards fixed networks or towards other certain networks for which the intra-network call establishment shall not be applicable. If the PLR 321 does not have a record matching the called mobile subscriber, it will answer the request for routing information with a negative indication or reply, indicating that no record or data relating to the called subscriber B 101 is available. In this case the IGW 322 will forward the call towards the home network of the called subscriber according to normal procedure. In other words, the gateway node 322 is routing the call to a gateway node 312 in the H-PLMN 310 if no routing information has been obtained from the PLR 321.

It may further be possible that the subscriber record of subscriber B 101 in the PLR 321 comprises additionally at least one indicator which indicates to the operator of the V-PLMN 320 whether the service of intra-network call establishment is available for this specific subscriber B 101. After the PLR 321 receives the request for providing routing information to the IGW 322 in step 402 the PLR 321 may check whether the at least one service indicator is available in the subscriber record of the called subscriber UE B 101 to indicate if the second subscriber has a subscription to the intra-network call service. If there is a service indicator available, the PLR 321 answers the request from the IGW 322 with message 405 and provides routing information to the gateway node IGW 322. If there is no service indicator available in the subscriber record the PLR 321 may send a negative response to the IGW 322, without providing routing information. If the indication of the intra-network routing service is not available in the subscriber record of the PLR 321 the IGW 322 routes the call to a gateway node 312 in the H-PLMN 310. In other words, the PLR 321 receives a request for routing information of the second call control node 324 and checks if the second subscriber has a subscription to the intra-network call service. If the second subscriber 101 has a subscription to the intra-network call service, the gateway node (322; 900) is provided by the PLR 321 with routing information of the second call control node 324. If the second subscriber 101 has no subscription to the intra-network call service, the PLR 321 sends a negative reply to the gateway node 322.

It may further be possible that the record of the called subscriber B 101 in the PLR 321 comprises indication of at least one other service related to the second subscriber 101. It may be possible that one of the other services is a call forwarding service for the second subscriber 101 to route the call to another subscriber which is not depicted in FIG. 3 or 4. It is therefore possible to establish services at a V-PLMN 320 of a subscriber 101 which has a subscription to a H-PLMN 310. The subscription to services in the V-PLMN 320 can be done via a secondary subscription by the subscriber B 101 to the operator of the V-PLMN 320. It may also be possible that the operator of the H-PLMN 310 of subscriber B 101 and the operator of the V-PLMN 320 have concluded a contract which comprises the execution of services, like the provisioning of intra-network calls according to the invention or any other services.

Figure 5:
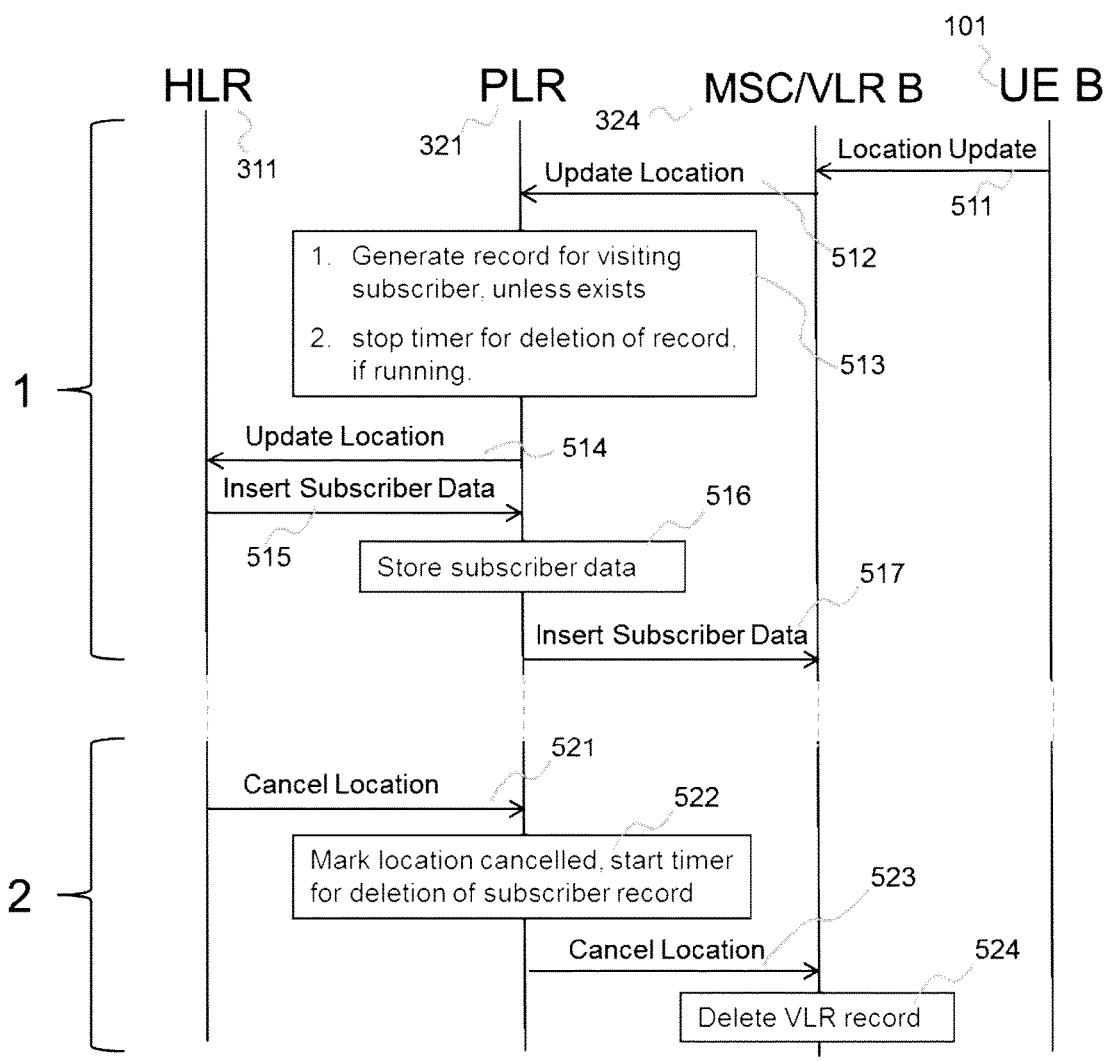
FIG. 5 shows another message flow diagram of a location update procedure according to one embodiment of the invention.

FIG. 5 shows a message flow diagram of a location update procedure according to one embodiment of the invention. In a first part of this diagram an update location procedure according to one embodiment of the invention is explained. In a second part of this diagram, a cancellation of a location according to one embodiment of the invention is explained. Both parts are marked with brackets on the left-hand side comprising the part-number 1 or 2.

In the first part a location update procedure is initiated by the UE B 101 when for example entering a location area which is controlled by a MSC/VLR B 324. This procedure is used to update subscriber data in the VLR of the MSC/VLR B 324 and to update the VLR address in the HLR 311 related to UE B 101. After UE B 101 sends a Location Update message 511 to the control node which serves the current location area, the MSC/VLR B 324 forwards an Update Location message 512 towards a register which comprises the subscriber data of subscriber UE B 101. This register may be a Home Location Register (HLR) 311 which is located in the H-PLMN 310 of the subscriber UE B 101. According to the invention the Update Location message 512 is intercepted by the PLR 321 located in the V-PLMN or network A 320. "Intercept" means that the Update Location message 512 is received by the PLR 321 and later on forwarded as an Update Location message 514 towards the HLR 311. After the PLR 321 has received the Update Location message 512, the PLR 321 checks whether a subscriber record or data is available in its storage. If the subscriber record is not available in the storage or memory of the PLR 321, the PLR 321 generates a subscriber record comprising at least the IMSI of the subscriber B 101 and the identifier or address of the serving control node MSC/VLR B 324. If a subscriber record is available in the PLR 321, the PLR 321 updates the data in this subscriber record by replacing or storing the address of the call control node MSC/VLR B 324, serving the subscriber 101. This is done in step 513. The address of the VLR of the MSC/VLR B 324 may also be named as the VLR reference.

After all data has been fetched by the PLR 321 from the content of the Update Location message 512 in step 513, the Update Location message 514 is forwarded towards the HLR 311 which sends as a reply a message "Insert Subscriber Data" 515 to the PLR 321. This message comprises the MSISDN, IMSI and additional subscriber data, like service indicators or any other limitation for that specific subscriber B 101. In other words the PLR 321 may forward the update location message to the subscriber register 311 in the H-PLMN 310 to update the record of the subscriber in the subscriber register 311 of the H-PLMN 310. The PLR 321 may add in step 516 some or all of the additional information into the subscriber record of subscriber B 101. After the PLR 321 has updated the subscriber record, the "Insert Subscriber Data" message 517 is forwarded towards the MSC/VLR B 324 for updating the VLR with the provided subscriber data. In other words, the PLR 321 sends an update location message to the subscriber register 311 in the H-PLMN 310 of the subscriber 101 to update the subscriber data in the subscriber register 311. The PLR 321 then receives from the subscriber register 311 subscriber data of the subscriber 101 and then forwards the subscriber data to the call control node 324.

The PLR 321 may store the subscriber data in such a way as to optimize retrieval when provided with either MSISDN (during call setup) or IMSI (during location update or cancellation).

The second part of FIG. 5 starts with a cancel location message 521 coming from the HLR 311 of subscriber UE B 101. This message may be sent after the UE B 101 has left the location area which is controlled or served by the MSC/VLR B 324. After the HLR 311 has been informed about the fact that the MSC/VLR B 324 is no longer the serving control node for UE B 101, the HLR 311 has to initiate the deletion of the subscriber record in the VLR of the former serving control node MSC/VLR B 324. The PLR 321 intercepts the Cancel Location message 521 and marks the subscriber record of subscriber UE B 101 as invalid. Then the "Cancel Location" message 523 is forwarded towards the MSC/VLR B 324. The data or record in the VLR is deleted in a last step 324.

When the subscriber UE B 101 moves within the V-PLMN 320 between service areas of an old MSC/VLR towards a new MSC/VLR, the UE B 101 sends a Location Update message towards the new MSC/VLR. This message is passed on and handled as depicted in FIG. 5. After having sent Update Location message to the HLR 311, the PLR 321 receives a Cancel Location message 521 from the HLR 311 directed towards the old MSC/VLR serving the subscriber UE B 101. The PLR 321 handles this message as described above referring to part 2 of FIG. 5, with the Cancel Location message being directed towards the old MSC/VLR. The PLR 321 handles the subsequently received Insert Subscriber Data message 515, which is directed towards the new MSC/VLR, as described above by storing subscriber data and forwarding the message to the new MSC/VLR.

It may be possible that a deletion timer is related to the subscriber record in the PLR 321. If a subscriber UE B 101 has left the location area controlled by the MSC/VLR B 324 the deletion timer may be started after the subscriber record has been marked as invalid. The deletion timer may be preconfigured by the operator to keep the subscriber record in the PLR 321 for a specific time, allowing maintaining proprietary subscriber related data in the V-PLMN 320, which is not available in the H-PLMN 310. If this deletion time is over and the deletion timer expires, the subscriber record in the PLR 321 may be removed or deleted. If the subscriber UE B 101 initiates a Location Update procedure with any control node located inside the V-PLMN 320 and the deletion timer in the PLR 321 related to the subscriber record of subscriber UE B 101 is still active the deletion timer will be stopped and the subscriber record will be updated. If the PLR 321 receives an update location request from a call control node 324 in the V-PLMN 320, which is related to the subscriber 101 there are two possibilities. If the deletion timer is running, the deletion timer is stopped and the address of the call control node 324 serving the subscriber (101) in the subscriber record is updated. If the subscriber record is not available at the PLR 321, a new subscriber record is generated in the PLR 321.

Implementing a deletion timer will reduce the control data traffic when the subscriber UE B 101 is e.g. near the border of the area covered by the V-PLMN 320 and switches repeatedly between the V-PLMN 320 and other networks.

Figure 6:
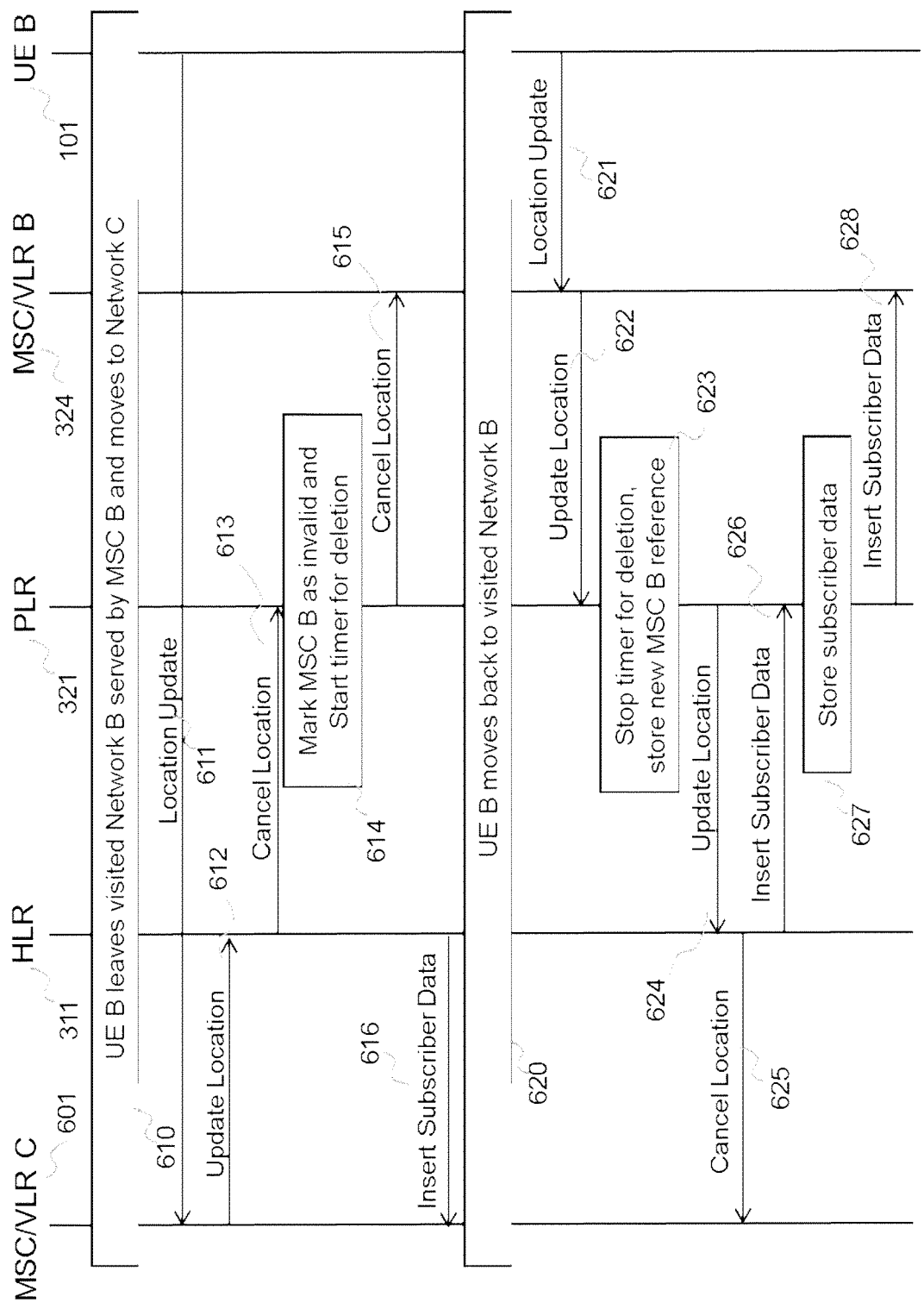
FIG. 6 shows another message flow diagram of a location update procedure according to another embodiment of the invention.

FIG. 6 shows another message flow diagram of a location update procedure according to another embodiment of the invention. It is assumed that subscriber UE B 101 leaves in a first step 610 the V-PLMN 320, served by the control node MSC/VLR B 324, and moves to Network C which is not part of the V-PLMN 320. UE B 101 sends a Location Update message 611 towards the new serving control node MSC/VLR C 601 in Network C. MSC/VLR C 601 sends an Update Location message 612 towards the HLR 311 in the H-PLMN 310 of UE B 101 to fetch subscriber data. After the HLR 311 is aware of the change of the serving control node from MSC/VLR B 324 to MSC/VLR C 601, it sends a Cancel Location message 613 towards the MSC/VLR B 324 to delete the VLR reference. The PLR 321 in the V-PLMN 320 receives the Cancel Location message 613 and marks the subscriber record of subscriber B 101 as invalid in a next step 614. In a further embodiment a deletion timer is started. The Cancel Location message 613 is further forwarded in a step 615 towards the MSC/VLR B 324. The subscriber record is deleted in the VLR of MSC/VLR B 324. The HLR 311 sends in step 616 the subscriber data towards the MSC/VLR C 601. The MSC/VLR C 601 stores the subscriber data in the VLR.

In step 620 it is assumed that UE B 101 is moving back to the V-PLMN 320 and sends a Location Update message 621 to the MSC/VLR B 324 which is now the new serving control node. MSC/VLR B 324 sends an Update Location message 622 towards the HLR 311 which is intercepted by the PLR 321. This means that the PLR 321 receives the Update Location message 622 and forwards the Update Location message 624 towards the HLR 311 via the PLR 321. After reception of the Update Location message 622 in the PLR 321 the new MSC/VLR B 324 reference is stored in relation to the identity of the UE B 101 which may be the MSISDN. If a deletion timer related to the subscriber record is running, the timer is stopped. If the deletion timer is not running, the PLR 321 only replaces the MSC/VLR reference stored in the subscriber record with the new MSC/VLR B 324 reference received in the Update Location message instead of establishing a new subscriber record.

The HLR 311 sends a Cancel Location message 625 towards the MSC/VLR C 601 to delete the subscriber record in its VLR. The HLR 311 further sends a message "Insert Subscriber Data" 626 towards the MSC/VLR B 324 which is received by the PLR 321 and is forwarded to the MSC/VLR B 324 in a step 628. After reception of the "Insert Subscriber Data" message 626 the PLR 321 may update the subscriber record in a step 627.

Figure 7:
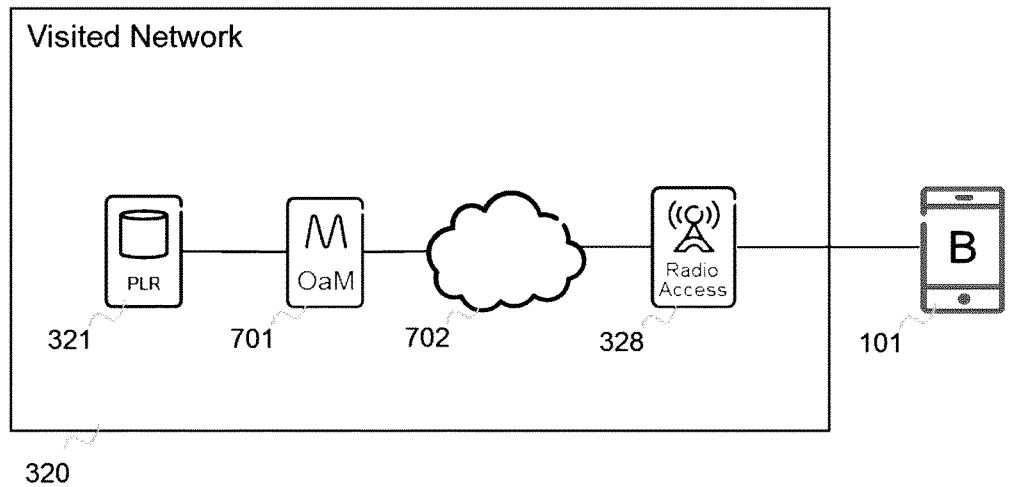
FIG. 7 shows a block diagram of a network layout in the visited network according to another embodiment of the invention.

In one embodiment of the invention an operational maintenance node OaM 701 according to FIG. 7 is provided in the V-PLMN 320 which is connected to the PLR 321 and which may be accessible via a network 702 by a UE of subscriber B 101. In this embodiment it is possible to set an indication of a service, to which the subscriber B 101 has subscribed, directly in the PLR 321. The intra-network call service according to the invention may be executed dependent on the indication in the PLR 321 entry. This service may be part of a service provisioning from the operator of the V-PLMN. This can be done by the operator via the maintenance node 701 or it can be done by the subscriber B 101 directly. It may be possible that the subscription to a service is limited to a defined time frame.

Figure 8:
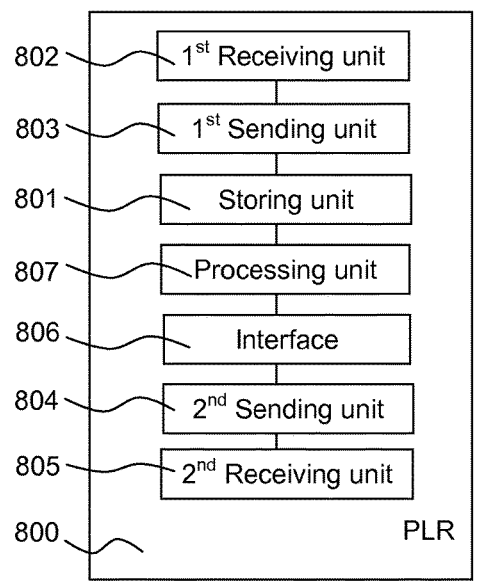
FIG. 8 shows a block diagram of a proxy location register, PLR, according to one embodiment of the invention.

FIG. 8 shows a block diagram of a PLR 800, of a V-PLMN 320 according to one embodiment of the invention. The PLR 800 comprises a storing unit 801 for storing the subscriber record of the subscriber 101, served by the call control node 324 in the V-PLMN, wherein the subscriber 101 has a subscription to an H-PLMN 310, which is different to the V-PLMN 320, and wherein the subscriber record comprises identification information of the call control node 324. The storing unit 801 may be any kind of memory which is adapted to store data. The storing unit 801 may be adapted to fetch the correct subscriber record based on the analysis of the IMSI or the MSISDN. Further the PLR 800 comprises a first receiving unit 802 for receiving, from a gateway node 322, 900 of the V-PLMN 320, a request for providing the routing information of the subscriber 101. The PLR 800 comprises a first sending unit 803 for sending the routing information to the gateway node 322, 900. It may be possible that the first receiving unit and the first sending unit are allocated to a single I/O-unit.

The PLR 800 may further comprises a second sending unit 804 for sending a request for a Roaming Number to the call control node 324 and a second receiving unit 805 for receiving a Roaming Number from the call control node 324. The first and second sending units 803, 804 and/or the first and second receiving units 802, 805 may be arranged in one single unit. The PLR 800 may further comprises an interface 806 for receiving, from an operation and maintenance node 701, an indication of a service related to the second subscriber 101. This indication may be stored in the storage unit 801.

The PLR 800 may further comprise a processing unit 807 adapted to check, based on subscriber data stored in the storage unit 801 and identified by identification information of the second subscriber 101 in the request for providing routing information leading towards the call control node serving the called subscriber 101, if the second subscriber 101 has a subscription to an intra-network call service. If the second subscriber 101 has a subscription to the intra-network call service, the routing information is sent to the gateway node 900 via the first sending unit 803. If the second subscriber 101 has no subscription to the intra-network call service, a negative reply is sent to the gateway node 900 via the first sending unit 803.

Figure 9:
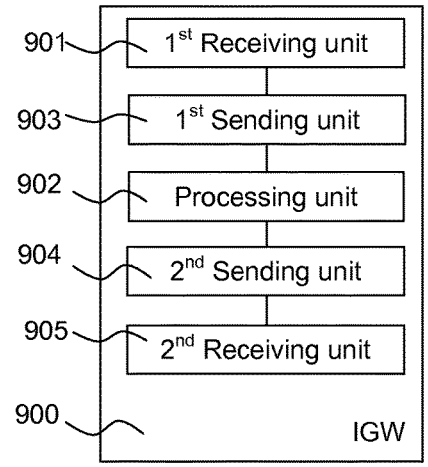
FIG. 9 shows a block diagram of a gateway node according to one embodiment of the invention.

FIG. 9 shows a block diagram of a gateway node 900 according to one embodiment of the invention. The gateway node 900 in the V-PLMN 320 comprises a first receiving unit 901 for receiving, from a first call control node 323 in the V-PLMN 320, a call setup message for setting up a call between a first subscriber 102, which is served by the first call control node 323, and a second subscriber 101 of a H-PLMN 310, which is different to the V-PLMN 320, and wherein the second subscriber 101 is served by a second call control node 324 in the same V-PLMN 320, the call setup message comprises identification information of the second subscriber 101. Further the gateway node 900 comprises a first sending unit 903 for sending a request for a roaming number to the PLR 321 in the V-PLMN 320. Further the gateway node 900 comprises a second receiving unit 904 for receiving a roaming number from the PLR 321 and a second sending unit 905 for sending the call setup message to the second call control node 324. If the gateway node 900 receives a negative answer from the PLR 321 not comprising the roaming number, the gateway node 900 will forward the call setup towards the gateway node in home telecommunication network of the called subscriber 101. The first and second sending units 903, 905 and/or the first and second receiving units 901, 904 may be arranged in one single unit.

The gateway node 900 may further comprises a processing unit 902 for checking, based on identification information of the second subscriber 101 in the call setup message, which may not be a MSISDN, if the identification information represents a subscriber of a Wireline Telephone Network (which can also be named as Public Switched Telephone Network). This first check can be done by analyzing the called party number. If this called party number indicates that the called subscriber or second subscriber 101 is a subscriber of a Wireline Telephone Network, the gateway node 900 will route the call based on the called party number towards a gateway node of the Wireline Telephone Network and the call setup will continue without any involvement of the PLR 321. In other words, the gateway node 900 checks, based on identification information of the second subscriber 101, if the identification information represents a subscriber of a Wireline Telephone Network and if the subscriber is a subscriber of a Wireline Telephone Network, the gateway node 900 routes the call towards that Wireline Telephone Network.

Further the sending unit 903 may send the request for a roaming number to the PLR 321 in the V-PLMN 320 only if the second subscriber 101 is not a subscriber of a Wireline Telephone Network. If the second subscriber 101 is a subscriber of a Wireline Telephone Network the intra-network call procedure does not apply because the request for a roaming number from the PLR 321 will not be successful. This will reduce the signalling traffic.

It is to be understood that the structures as illustrated in FIGS. 8 and 9 are merely schematic and that the nodes may actually include further components which, for the sake of clarity, have not been illustrated, e.g., further interfaces. For example, multiple network interfaces could be provided which are configured to allow communication with different types of other nodes. Also, it is to be understood that the processing units 807, 902 may include further types of program code modules, which have not been illustrated, e.g., program code modules for implementing known functionalities of a gateway node, such as a GMSC or a GGSN. It is to be understood that the different units may all be connected to each other in the respective nodes.

The invention claimed is:

1. A method performed by a proxy location register (PLR) for establishing an intra-network call between a first subscriber, which is served by a first call control node in a visited public land mobile network, V-PLMN, and a second subscriber of a home public land mobile network, H-PLMN, which is different to the V-PLMN, and wherein the second subscriber is served by a second call control node of the same V-PLMN as the first call control node, comprising the steps of:
   receiving a request from a gateway node of the V-PLMN for routing information of the second call control node to establish the intra-network call between the first subscriber and the second subscriber;
   responsive to receiving the request, accessing a subscriber record of the second subscriber comprising identification information of the second call control node of the V-PLMN serving the second subscriber; and
   communicating to the gateway node routing information comprising the identification information of the second call control node serving the second subscriber to establish the intra-network call between the first subscriber and the second subscriber.

2. The method according to claim 1, wherein the intra-network call is routed inside the V-PLMN to the second call control node.

3. The method according to claim 1, wherein the method further comprises the step of communicating, to the second call control node, a request for a roaming number of the second subscriber from the second call control node.

4. The method according to claim 1, wherein receiving a request from the gateway node for routing information of the second call control node comprises:
   determining whether the second subscriber has a subscription to the intra-network call service based on the subscriber record of the second subscriber;
   responsive to determining the second subscriber has a subscription to the intra-network call service, communicating to the gateway node the routing information comprising the identification information of the second call control node; and
   responsive to determining the second subscriber has no subscription to the intra-network call service, sending a negative reply to the gateway node.

5. The method according to claim 1, wherein the identification information comprises an address of the second call control node retrieved by the PLR during a location update procedure initiated by the second subscriber when the second subscriber registers at the second call control node.

6. The method according to claim 1, wherein the subscriber record further comprises indication of at least one service related to the second subscriber.

7. The method according to claim 6, wherein the at least one service is the intra-network call service.

8. The method according to claim 6, wherein the at least one service is a call forwarding service for the second subscriber to route the call to another subscriber of the V-PLMN.

9. A proxy location register, PLR, of a visited public land mobile network, V-PLMN, comprising at least one processor and memory configured to:
   store a first subscriber record of a first subscriber, served by a first call control node in the V-PLMN, wherein the first subscriber has a subscription to a home public land mobile network, H-PLMN, which is different to the V-PLMN, and wherein the first subscriber record comprises identification information of the first call control node;
   receive, from a gateway node of the V-PLMN, a request for routing information of the first call control node serving the first subscriber to establish an intra-network call between the first subscriber and a second subscriber served by a second call control node of the V-PLMN;

responsive to receiving the request, access the stored first subscriber record to obtain the identification information of the first call control node; and communicate the routing information comprising the identification information of the first call control node to the gateway node to establish the intra-network call between the first subscriber and the second subscriber.

10. The PLR according to claim 9, wherein the at least one processor and memory is further configured to:

communicate a request for a Roaming Number of the first subscriber to the first call control node; and responsive to communicating the request, receive a Roaming Number from the first call control node.

11. The PLR according to claim 9, further comprising an interface configured to receive, from an operation and maintenance node, an indication of a service related to the first subscriber and storing this indication in the first subscriber record.

12. The PLR according to claim 9, wherein the at least one processor and memory is further configured to:

determine, based on the first subscriber data whether the second subscriber has a subscription to an intra-network call service;

responsive to determining the first subscriber has a subscription to the intra-network call service, communicate the routing information comprising the identification information of the first call control node to the gateway node; and responsive to determining the first subscriber has no subscription to the intra-network call service, communicate a negative reply to the gateway node.

13. A computer program product comprising a non-transitory computer readable storage medium storing instructions which, when executed on at least one processor, cause the at least one processor to carry out the method according to claim 1.

* * * * *